(12) United States Patent
Jenkins, Jr.

(10) Patent No.: US 6,496,830 B1
(45) Date of Patent: Dec. 17, 2002

(54) IMPLEMENTING DESCENDING INDEXES WITH A DESCEND FUNCTION

(75) Inventor: Robert J. Jenkins, Jr., Foster City, CA (US)

(73) Assignee: Oracle Corp., Redwood Shores, CA (US)

(*) Notice: Subject to any disclaimer, the term of this patent is extended or adjusted under 35 U.S.C. 154(b) by 0 days.

(21) Appl. No.: 09/330,071

(22) Filed: Jun. 11, 1999

(51) Int. Cl.[7] .............................................. G06F 17/30
(52) U.S. Cl. .............................. 707/100; 707/7; 707/102
(58) Field of Search ............................. 707/7, 100, 102

(56) References Cited

U.S. PATENT DOCUMENTS

| | | | | |
|---|---|---|---|---|
| 5,924,091 A | * | 7/1999 | Burkhard | 707/7 |
| 6,070,164 A | * | 5/2000 | Vagnozzi | 707/100 |
| 6,128,610 A | * | 10/2000 | Srinivasan et al. | 707/3 |
| 6,338,056 B1 | * | 1/2001 | Dessloch et al. | 707/2 |
| 6,199,064 B1 | * | 3/2001 | Schindler | 707/7 |
| 6,266,665 B1 | * | 7/2001 | Vaidyanathan et al. | 707/7 |
| 6,374,232 B1 | * | 4/2002 | Dageville et al. | 707/2 |

* cited by examiner

Primary Examiner—Greta L. Robinson
(74) Attorney, Agent, or Firm—Ditthavong & Carlson, P.

(57) ABSTRACT

A method and apparatus is disclosed for implementing descending indexes in a database management system. A key value to be inserted within an index is decomposed into individual data bytes, such as an integer character value, that make up the key value and dictate the location where the key value will be inserted relative to other key values. A first function is applied to the data sequences in order to generate a reversed key value having reversed sorting properties. The reversed key values are then inserted into the index. The resulting index thus contains key values that are sorted in descending order. Additionally, indexes may be created on multiple key columns, with the sub_keys being independently sorted in either ascending or descending order. The present invention also discloses transformations that may be performed by a server in order to properly interpret statements that require the creation of standard or functional indexes in descending order.

46 Claims, 11 Drawing Sheets

| Row ID | Last Name | First Name | Department | D.O.B. |
|---|---|---|---|---|
| 1 | Bailey | Jack | accounting | 1/2/45 |
| 2 | Adams | William | payroll | 7/15/45 |
| 3 | Sep | Righty | legal | 5/12/46 |
| 4 | Felitia | de Medic | accessories | 8/23/37 |
| 5 | Demiurge | Willis | accounting | 2/2/47 |
| 6 | Casey | Frank | accounting | 5/20/49 |
| 7 | Zack | Jack | accessories | 11/11/42 |
| 8 | Yarro | Mary | accessories | 2/15/56 |
| 9 | Wierdo | Arnold | legal | 7/12/53 |
| 10 | Brandt | Glenn | houseware | 5/23/66 |
| 11 | Edgar | Theo | facilities | 2/20/60 |
| 12 | Hardin | Huggy | legal | 5/11/40 |
| 13 | Hill | Phil | shop | 2/12/63 |
| 14 | Lowel | Bill | shop | 7/23/58 |
| 15 | Moore | Marie | payroll | 7/11/71 |
| 16 | Zimmerman | Guy | shop | 12/5/62 |

| Row ID | Department |
|--------|------------|
| 7      | accessories |
| 8      | accessories |
| 4      | accessories |
| 5      | accounting |
| 6      | accounting |
| 1      | accounting |
| 11     | facilities |
| 10     | houseware |
| 9      | legal |
| 3      | legal |
| 12     | legal |
| 15     | payroll |
| 2      | payroll |
| 16     | shop |
| 14     | shop |
| 13     | shop |

| | | | | | | | ← 752 |
|---|---|---|---|---|---|---|---|
| 0 | 1 | 0 | 2 | 0 | 5 | 1 | 9 | 0 | ← 752 |
| 1 | 3 | 1 | 4 | 2 | 1 | 8 | 9 | 1 | ← 754 |
| 1 | 3 | 1 | 4 | 2 | 1 | 8 | 9 | 1 | ← 756 |
| 254 | 252 | 254 | 251 | 253 | 254 | 247 | 250 | 254 | 246 | 254 | 255 | ← 758 |

FIG. 7C  (750)

| | | | | | | | ← 772 |
|---|---|---|---|---|---|---|---|
| 254 | 252 | 254 | 251 | 253 | 254 | 247 | 250 | 254 | 246 | 254 | 255 | ← 772 |
| 1 | 3 | 1 | 4 | 2 | 1 | 8 | 9 | 1 | ← 774 |
| 1 | 3 | 1 | 4 | 2 | 1 | 8 | 9 | 1 | ← 776 |
| 0 | 1 | 0 | 2 | 0 | 5 | 1 | 9 | 0 | ← 778 |

FIG. 7D  (770)

IMPLEMENTING DESCENDING INDEXES WITH A DESCEND FUNCTION

FIELD OF THE INVENTION

The present invention relates to database management systems and more particularly to methods and apparatus for implementing indexes in database management systems.

BACKGROUND OF THE INVENTION

Database management systems provide users the ability to store, update, and retrieve information by submitting commands to a database server. To be correctly processed, the commands must comply with a database language that is supported by the database server. One popular database language is known as the Structured Query Language (SQL). SQL provides a user with the ability to create tables that can be used to store various types of information.

Database management systems typically create tables in the form of abstract data structures and/or objects for retaining information. The tables are generally organized in the form of rows and columns. Each row in the table represents an individual record. For example, a table that stores employee records may contain columns that store: last names, first names, date of birth, employee number, department, etc. Each row in the table stores the same column information for a different employee.

SQL also provides a user with the ability to generate complex queries that can be used to retrieve specific information from the tables. The information retrieved may be further organized into meaningful form for subsequent presentation and/or analysis. For example, a user may generate a query that results in the creation of an answer table containing only the last names and departments of all employees. This information can be subsequently organized by department in order to assess staffing requirements.

In a typical database system, data is stored in a table in an unordered form. As records are entered into the table, they are inserted into the next available location. Such a location can often be at a non-contiguous storage sector of a permanent storage device, such as a fixed disk drive or optical drive, relative to the location of the previous record. Consequently, it is not always possible to directly access and/or retrieve a specific record or a range of records. In the absence of supplemental data structures, every row in the table must be examined to properly execute a query that requires retrieval of one or more records.

Many database systems provide an object type called an index that can significantly increase the speed of certain data retrieval processes. A database index is conceptually similar to a normal index found at the end of a book, in that both kinds of indexes comprise an ordered list of information accompanied by a reference location within the book where the information can be found. The index is maintained separately from the actual database table for which the index is created.

A database index can be considered to be a mini table, where each "row" is an index entry that contains a key value and a pointer. The key value of an index entry is a value created from the values in one or more columns of a corresponding row of the table. Those columns are referred to as "key columns". The pointer of an index entry points to the location of the row that corresponds to the index entry.

For example, assume that an index is built on the last name (or first name) column of the employee table mentioned above. Each entry in the index would include a key value formed from the last name (or first name) column found in a row of the employee table. Thus, a typically entry of the index would have the form <Smith, rowid>(or John, rowid), where "Smith" (or "John") is the key value for the index entry, and rowid is a pointer to the corresponding row of the table which has "Smith" in the last name column (or "John" in the first name column).

Unlike the rows of a table, the entries in the index are maintained in a sorted order. For example, if a table contains a column that stores date information, an index may be created on the date column. The resulting index would contain entries that are sorted in an order (typically chronological) that is based on the dates contained therein. Accordingly, information may be efficiently retrieved for a range of dates based on the sorted order of the index.

In order to improve processing of queries involving multiple column constraints, an index can be created on multiple columns of the table. Such an index would include composite key values in the form of column1.column2, where column1 and column2 are the constraint columns from the table. For example, an index built on a student information table can be created on both a grade_level column and a student_identification column. The index would include a composite key (grade_level. student_identification) that is sorted in ascending order based on the grade_level. In addition, within each grade level, the index would be further sorted in ascending order based on the student_identification of students in each particular grade_level.

There are situations where it may be desirable to create the index such that the grade_level sub_key is sorted in ascending order and, within each grade level, the student_identification sub_key is sorted in descending order. Similarly, a client may want the index created such that the grade_level sub_key is sorted in descending order and the student_identification sub_key is sorted in ascending order.

SQL does not provide the ability to sort an index in descending order. There exist, however, specific database systems that provide extended commands which allow sorting of an index in descending order. For example, some approaches to providing descending-ordered indexes do not actually create indexes with entries that are sorted in descending order. Rather, each "descending" index is created and sorted in ascending order, but read in reverse to simulate an index sorted in descending order. This ability does not allow sorting of indexes that have composite keys such that a first sub_key is sorted in ascending order, while a second sub_key is sorted in descending order.

Another approach to creating indexes having composite keys stores metadata that indicates whether a sub_key should be sorted in ascending order or descending order. The system then switches between two different comparison functions, based on the metadata, to sort each sub_key. Although this allows a first sub_key to sort in ascending order, while a second sub_key sorts in descending order, it requires code that touches indexes to know which sub_keys sort in ascending order, and which sub_keys sort in descending order. Adding special cases such as this to code takes time, makes the code run slower, introduces bugs, and makes future code maintenance more difficult.

Based on the foregoing, a disadvantage associated with current methods of implementing database indexes is the inability to create an index on multiple columns of a table wherein various sub_keys of the index may be sorted in either ascending and/or descending order without requiring all the code that reads and modifies indexes to treat any sub_key as special.

SUMMARY OF THE INVENTION

There is a need for methods and apparatus that allow creation of indexes that include composite keys wherein the sub_keys may be individually sorted in ascending order, descending order, or a combination of ascending and descending order, while allowing all code that reads and manipulates indexes to sort all sub_keys in ascending order.

These and other needs are addressed by the present invention, wherein a database server reverses the sortability of key values in an index that must be sorted in descending order, thereby allowing sorting of multiple sub_keys in any combination of ascending or descending order using only one sort function.

The sortability of a key value refers to the characteristic of the key value that determines the order of a key value relative to other key values. For example, a database server may sort based on a letter-by-letter comparison between key values, or based on a byte-by-byte comparison between key values. In a system where sorting is performed on a letter-by-letter basis, the sortability of a key can normally be reversed by replacing 'A's with 'Z's, 'B's with 'Y's, etc. Furthermore, the sortability of a key value is a property of the key value alone, and not a property of the sort method. In other words, the sortability of a key value dictates the order in which the keys are sorted using a prescribed sort method.

If a first key K1 has a value that is greater than the value of a second key K2, then the second key K2 would precede the first key K1 in the sort order. Under these circumstances, the sortability of K2 is reversed by mapping the value of K2 to a value that is greater than the first key K1. Accordingly, after the sortability of K2 has been reversed relative to K1, K1 would precede the second key K2 in the sort order. The same sort method is used, however, regardless of the sortability of the key values.

In accordance with one aspect of the present invention, a method for implementing descending indexes allows a database server to receive a statement that requires building an index, in descending order, on at least one key column. Next, the sortability of each key value in the key columns is reversed to form a plurality of reversed key values. The database server creates the index and sorts the reversed key values from the key columns in ascending order.

According to another aspect of the invention, the reversal process is selected such that the original key values can be reconstructed from the reversed key values. The index entries are sorted based on their reversed key values, hence resulting in an ordering of the index key values that is reversed (i.e., descending order) relative to the ordering that would have resulted if the index entries had been sorted based on the original key values. After the index entries are sorted, the original key values are reconstructed from the reversed key values to allow access to the original key values by the database server.

In addition, the sortability of each value from a key column may be reversed as the value is retrieved from the table, thereby allowing immediate sorting of entries during initial creation of the index. Since the sub_key values from each key column are separate when retrieved from the table, sub_key values from individual key columns may be selectively reversed, and sorted in either ascending order or descending order, during the creation of indexes built on composite keys. This allows the creation of composite-key indexes that contain, for example, a first sub_key sorted in descending order, a second sub_key sorted in ascending order, and a third sub_key sorted in descending order using the same sort method.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is an exemplary table illustrating the organization of data;

FIG. 3 illustrates the structure of an index created on a column of the table shown in FIG. 2;

FIG. 7C is a table illustrating different stages of an exemplary index entry during application of the DESCEND function, according to a second embodiment of the present invention;

FIG. 7D is a table illustrating different stages of an exemplary index entry during application of the UNDE-SCEND function, according to the second embodiment of the present invention;

DETAILED DESCRIPTION OF THE PREFERRED EMBODIMENT

A method and apparatus are described for creating and using indexes built on composite keys, where the sub_keys within the composite keys are capable of being individually sorted in ascending and/or descending order. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
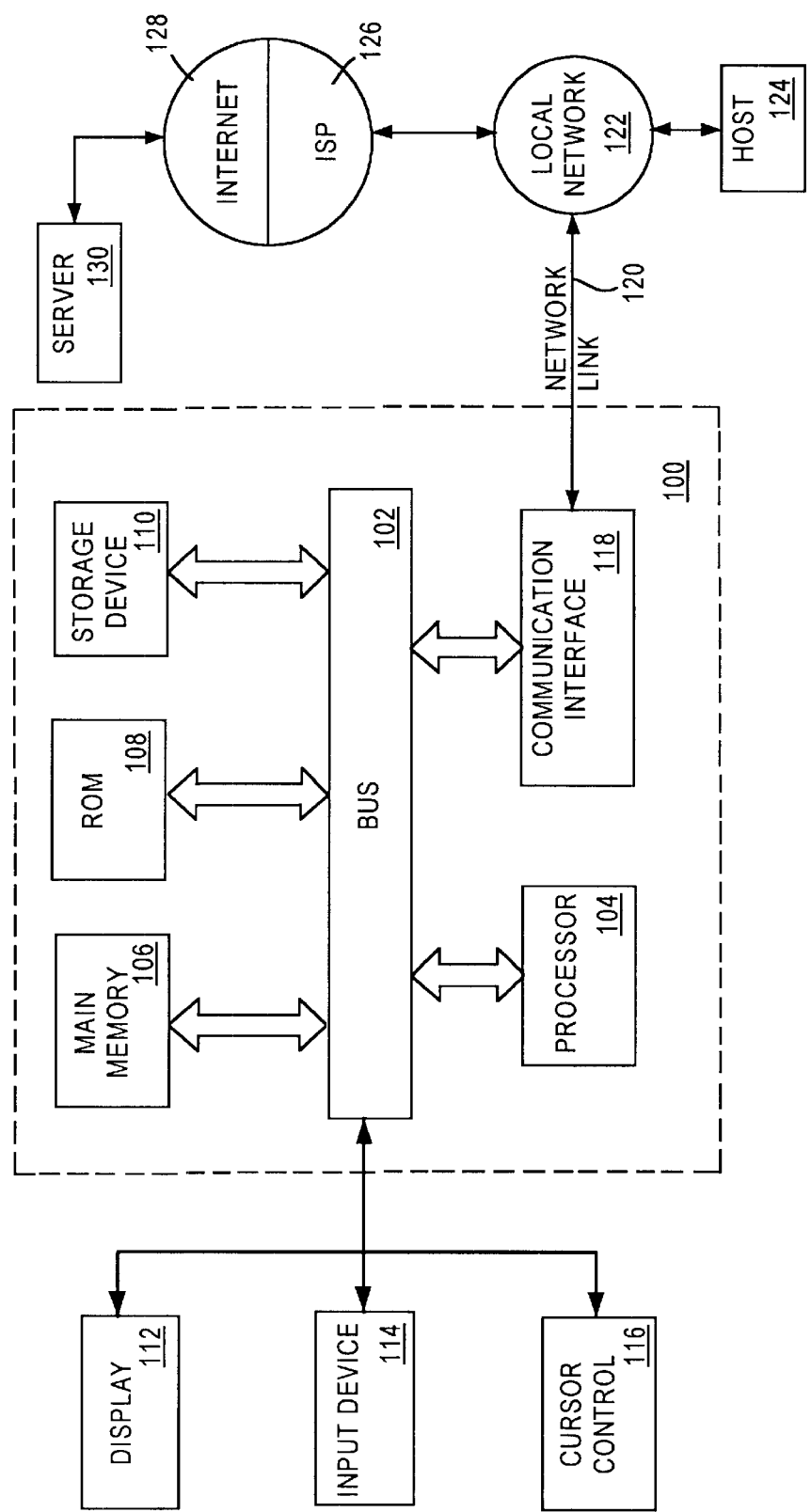
FIG. 1 is a block diagram illustrating a computer system that may be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 maybe coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing descending indexes in a database management system. According to one embodiment of the invention, an index is generated by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides SQL instructions for implementing indexes in a database management system as described herein.

The received code may be executed by processor 104 as it is received, and/or stored in storage device 110, or other non-volatile storage for later execution. In this manner, computer system 100 may obtain application code in the form of a carrier wave.

In a database management system (DBMS), data is stored in one or more "data containers". Each container stores one or more records, and the data within each record is organized into one or more fields. In relational database systems, the data containers re referred to as tables, the records are referred to as rows, and the fields are referred to s columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Tables and Indexes

FIG. 2 is a block diagram illustrating a typical table 200 within a database system. The table 200 includes a Row_ID column 210 that uniquely identifies each particular row of data within the table 200. For example, in certain database systems, the values that comprise the Row_ID column 210 are the actual physical locations on a storage device where each row 220 is stored. The Row_ID column 210 is generally not displayed when a user creates or manipulates the table 200.

The table 200 also includes a plurality of columns, namely: Last_Name 230, First_Name 232, Department 234, and D.O.B. 236 (Date of Birth). As exemplified in FIG. 2, each row 220 in the table 200 stores column information that is specific to a particular employee.

As illustrated in FIG. 2, the table 200 is organized in no particular order. Hence, the entire table 200 must be scanned, or examined, in order to retrieve a particular record.

Referring to FIG. 3, an index 300 can be created on the table 200 in order to sort the rows 220 based on specified user preferences. The index 300 has been created on the Department column 234 of the table 200 and sorted in ascending order. Within the index 300, the Department column is referred to as a key column 320. The index 300 allows speedy access to individual records based solely on the sorted order of the key column 320. Once an entry is located, the value stored in a corresponding Row_ID column 310 can be used to directly access the actual record from the table 200.

Fully Ordered Sets

Typically, the comparison of two relatively large values, such as values from the key column of a table, involves a series of smaller comparison operations. During this series of smaller comparison operations, segments of the larger values are compared with each other. The segments used in such comparisons operations are elements from a fully ordered set of values.

A fully ordered set of values refers to a set having a countable number of elements, wherein each element has a unique and fixed sorting value relative to the other elements within the set. In other words, no two elements within the set will sort to the same location. For example, the alphabet is a fully ordered set, composed of letters (A–Z) that have prescribed sort properties. A computer WORD can be considered a fully ordered set of values having elements that are numbers ranging from $0 \sim 2^{32}$.

The most common fully ordered set of values, however, is a byte. A byte is a set of values ranging from 0~255, that can include, for example, characters and/or symbols (i.e., elements). Bytes represent a common medium for storing values within digital computers. Further, existing standards have assigned prescribed values for letters, numbers, and symbols within the byte set (i.e., the range of values between 0~255), as will be described in greater detail hereinbelow. For purposes of simplicity and illustration, the description that follows will refer primarily to bytes (i.e., elements having a value, or sort property, in the range of 0~255). It should be noted, however, that any fully ordered set of values may be used.

Within a table, key values from a particular column may consist of character strings that have a plurality of characters. However, the comparison between the key values is normally performed on a character-by-character basis. That is, a comparison between two values would be performed using a series of comparisons between corresponding characters from the two key values. Since the characters are selected from the byte set, the comparison operation is referred to as a byte-by-byte comparison.

As shall be explained in greater detail below, in various embodiments of the invention, characters from the byte set are used during the process of transforming and reconstructing key values.

Sortability and Sorting

As previously stated, the sortability of a key value refers to the characteristic of the key value that determines the order of the key value relative to other key values. Furthermore, the sortability of a key value is a property of the key value that dictates the order in which the keys are sorted. According to the disclosed embodiment of the invention, the sortability of key values is dictated by a standard sort function such that reversing the sortability of the key values allows the sort function to sort the reversed key values in reversed (i.e., descending) order.

For example, in order to determine which of two key values (e.g., key_1 and key_2) sorts higher, each corresponding character in the key values is compared using a two-step process. Specifically, during the first step, the server compares the $i^{th}$ character of key_1 (e.g., key_1[i]) to the $i^{th}$ character of key_2 (e.g., key_2[i]). If the letter value of key_1[i] is greater than the letter value of key_2 [i], then key_1 will sort higher than key_2. If the letter value of key_2[i] is greater than the letter value of key_1 [i], then key_2 will sort higher than key_1. The first step is incrementally repeated until all the characters of the shorter key value have been examined (i.e., while i is less than the length of the shorter key value). If the first step fails to identify which key value will sort higher, then the server will proceed to perform the second step.

During the second step, the server compares the length of the two key values. In other words, the length of the character string that makes up key_1 is compared to the length of the character string that makes up key_2. If key_1 is longer than key_2, then key_1 will sort higher than key_2. If key_2 is longer than key_1, then key_2 will sort higher than key_1. Otherwise, key_1 is equal to (i.e., identical) to key_2, and it doesn't matter which one sorts higher.

Operational Overview

According to an embodiment of the present invention, the sortability of key values is reversed by applying the key values to a function that modifies the key values in a way that reverses their sort order. For simplicity, a function that reverses the sortability of key values is referred to herein as a "DESCEND" function. Furthermore, according to the disclosed embodiment of the invention, a DESCEND function has three properties: (1) it takes an arbitrary, variable-length string as a parameter; (2) changes the sortability of the string; and (3) is a reversible function.

As used herein, an arbitrary variable-length string is a string (i.e., a key value) that can be of any length, and each element of the string is selected from a fully ordered set of values. For example, in the description that follows, the fully ordered set of values is selected to be the set of bytes, and each element is a character that can be mapped to a value in the range of 0–255. Furthermore, the length of the string that comprises the key value can be of any length and is not restricted in any way.

An important feature of the present invention is that it provides an ability to sort key values in reverse order, without the need to change the function involved in the sort application. The transformed key values produced by applying key values to the DESCEND function are referred to herein as "reversed key values". A descending index is an index in which index entries are sorted in ascending order based on reversed key values. Because the sortability of the reversed key values is the reverse of their corresponding key values, the index entries of a descending index are actually in descending order relative to the original key values.

The original key value for an index entry that is stored according to a reversed key value may be recovered by applying the reversed key value to another function that is complementary to the DESCEND function. Such a function is referred to herein as an "UNDESCEND" function. The UNDESCEND function is specifically designed to operate in correspondence with the DESCEND function to restore the original key values.

The reversed key values generated by the DESCEND function, in and of themselves, cannot be meaningfully interpreted. Regardless of the manner in which the server defines particular data fields for comparison in order to sort the index, the result will be an uninterpretable string of the selected data sequence. Furthermore, when used alone, both the DESCEND function and the UNDESCEND functions will return an uninterpretable string of data.

According to one embodiment, the DESCEND and UNDESCEND functions are implemented internally so that they are not exposed through SQL. Rather, an SQL statement that requires creation of an index is used to mask the two functions. Although not required, the statement can include an optional parameter that specifies a particular sort order for individual key columns of the index. If no sort order is specified, then an ascending sort order is assumed. Hence, the DESCEND and UNDESCEND functions are transparent to the SQL syntax parser. For example, an SQL statement such as:

CREATE index IDX on table (Last_Name DESC)

specifies the creation of an index built on the key column Last_Name of "table", in which index entries are sorted in descending order relative to their original key values. In response to this statement, the database server transparently applies the Last_Name values to the DESCEND function to create reversed Last_Name values, and creates an index with index entries sorted based on the reversed Last_Name values.

According to one embodiment, the database server sets a flag in the metadata associated with each column index to indicate the sort order of that key column of the index. When entries are added to or retrieved from the index, the server examines the flag in order to determine whether or not the DESCEND and UNDESCEND functions should be applied to the key values (or to the individual components of composite key values) associated with the entries.

The key values that are applied to the DESCEND function are represented within a computer system as a series of characters (or bytes). The series of characters that constitute a key value that is being applied to the DESCEND function is referred to herein as the "input byte series", while the series of characters produced by the DESCEND function is referred to herein as the "output byte series".

In operation, the DESCEND function receives the input byte series that make up the individual key values, and generates a transformed series of data bytes, i.e., the output byte series. The UNDESCEND function receives an output byte series that was produced by the DESCEND function and generates a restored byte series that is identical to the original input byte series, hence resulting in the original key value. Specific details corresponding to the operation of the DESCEND and UNDESCEND functions will be further described hereinbelow.

According to the disclosed embodiment of the invention, the DESCEND and UNDESCEND functions are complementary and work in conjunction with one another. Hence, the values used by, and the operations performed by, the UNDESCEND function are specifically selected to correspond with the values used by, and operations performed by, the DESCEND function so that the original key values may be recovered.

Descending Indexes

Figure 4:
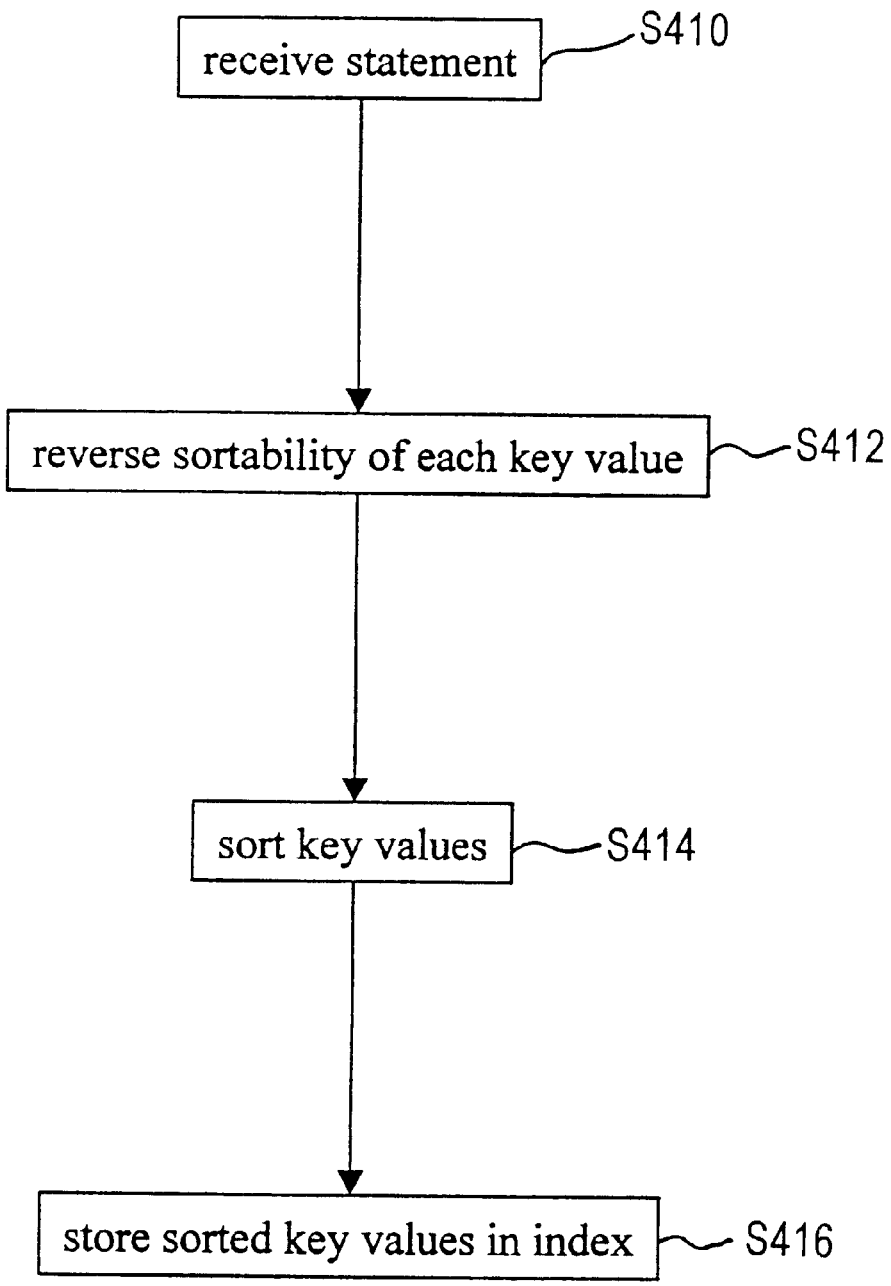
FIG. 4 is a flow chart illustrating creation of a descending index in accordance with an embodiment of the present invention.

Referring to FIG. 4, a flow chart is illustrated to outline the steps performed when creating an index in descending order according to an embodiment of the present invention. The index will be created based upon a statement received by the database server at step S410. At step S412, the server performs an operation that reverses the sortability of each key value retrieved from the column upon which the index will be built. Such an operation corresponds to application of the DESCEND function to the entries of the key column in order to generate reversed key values. At step S414, the reversed key values are sorted. At step S416, the reversed key values are stored in the index. Since the key values were reversed prior to sorting, the index will contain key values that are sorted in descending order.

According to the disclosed embodiment of the invention, in order to retrieve a key value from an index containing reversed key values, the index is searched based on a search key specified in a query. The search key is first transformed to a reversed search key. Next, the index is traversed based on the reversed search key in order to locate any entries that match the search key. Rows pointed to by entries that match the reversed search key are then retrieved from the table.

Transforming Key Values

A key value is treated by the DESCEND function as a list of zero or more characters. As previously stated, a character can be defined to be an element from a fully ordered set of values (i.e., the byte set). The American National Standards Institute (ANSI) sets forth standards that define an exemplary byte set. ANSI uses single quotes to denote letter values and double quotes to denote a series of letter values. The characters are assigned to respective letters such that it is possible to perform sorting operations. For example, the letter 'A' has an assigned letter value of 65, while the letter 'B' has an assigned value of 66. Hence, during a sort operation, 'A' would normally be sorted before 'B'.

For any given key column, the database server can place a limit on the number of letters used to represent the key values that belong to the column. The maximum number of bytes that can be used to represent key values from a given column is referred to herein as the maximum byte size of that key.

The server looks at the input byte series one byte at a time. Whenever it finds a substring that is one of a first set of substrings, it replaces that substring with a matching substring from a second set of substrings. The second substring may be longer than the first. An error is raised if the maximum string length is exceeded. Next, if the maximum string length has not been exceeded, a "suffix " with a value of 0 is appended to the byte series. Next, each character is complemented to form the output byte series. As previously stated, the output byte series represents a reversed key value capable of being sorted in descending order relative to the original key value.

The server parses the input byte series into individual characters that will be used in comparing the key values for sorting. Next, each character is complemented to form the output byte series. As previously stated, the output byte series represents a reversed key value capable of being sorted in descending order relative to the original key value.

Figure 5:
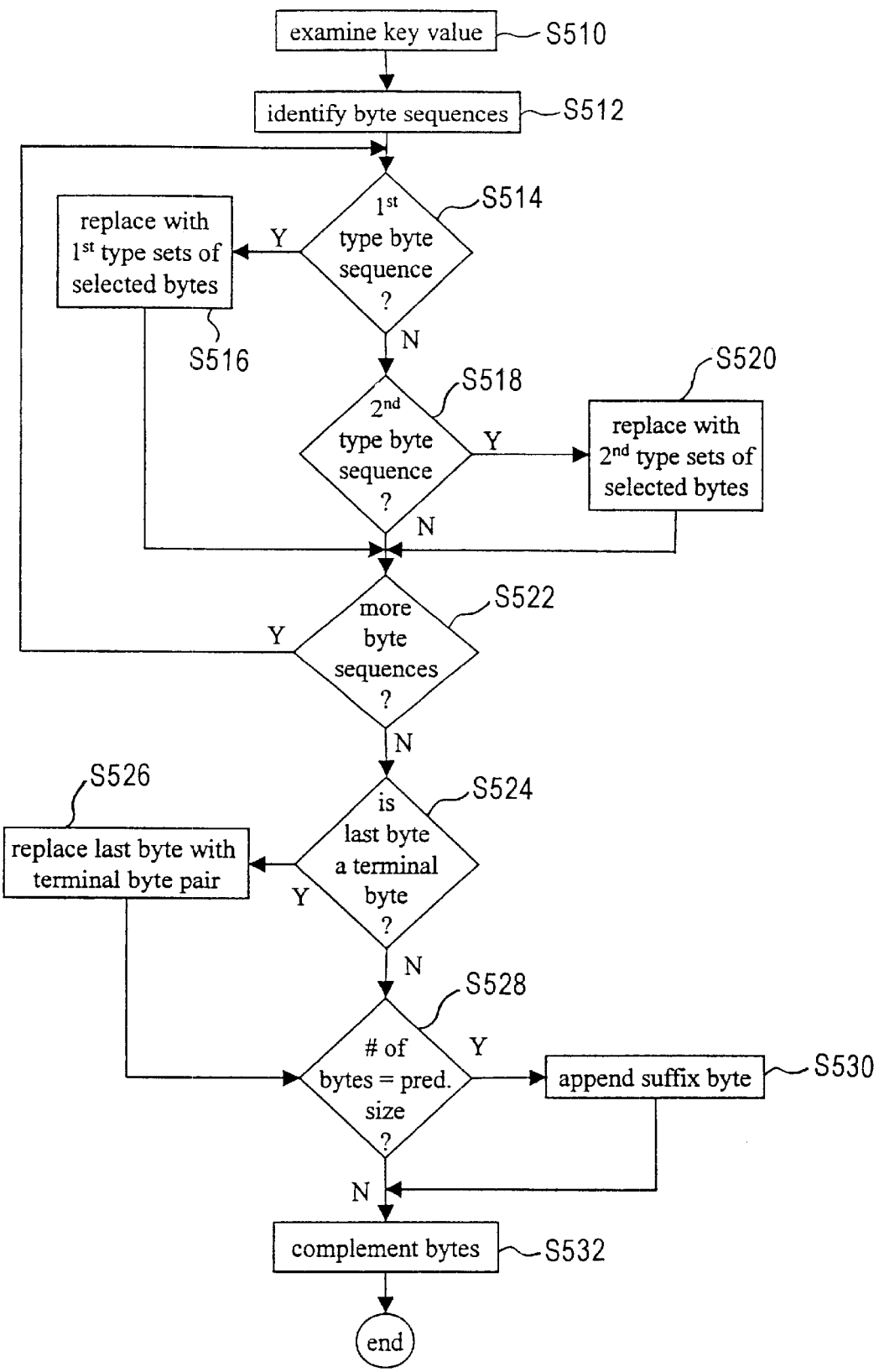
FIG. 5 is a flow chart detailing the steps necessary to reverse the sortability of index entries.

FIG. 5 is a flow chart illustrating the steps performed when reversing the sortability of a key value (i.e., application of the DESCEND function to a key value) according to one embodiment of the invention. At step S510, the server receives a key value to transform. At step S512, the server parses the input byte series into one or more byte sequences. According to the disclosed embodiment of the present invention, during step S512, the server examines each character in the input byte series. As previously stated, various fully ordered sets of values such as, for example, a word can be used by the server.

At step S514, the server determines whether the identified byte sequences are of a first type. If a byte sequence is of a first type, then it is replaced with a first type set of selected bytes at step S516. If a byte sequence is not of the first type, then at step S518, the server determines whether the byte sequence is of a second type. If the byte sequence is of the second type, then it is replaced with a second type set of selected bytes at step S520. If the byte sequence is neither a first type or second type, then it is not replaced. Each identified byte sequence must be examined until the entire input byte series (i.e., key value) has been checked. Accordingly, at step S522, the server determines if there are additional byte sequences that must examined. If there are additional byte sequences, then control returns to block S514. If there are no additional byte sequences, then control passes to block S524.

According to a first embodiment of the invention, the first type of byte sequence corresponds to the character value 0, while the second type byte sequence corresponds to the character value 1. Additionally, the first type set of selected bytes that replaces the first type byte sequence corresponds to the two character values 1 and 1 (i.e., 1 1), while the second type set of selected bytes corresponds to the two character values 1 and 2 (two bytes). Therefore, every character examined by the server that has a value of 0 is replaced with the two characters 1 and 1. Similarly, every character that has a value of 1 is replaced with the two character values 1 and 2. After each byte sequence is replaced, the output series length is compared to the maximum output series length. If the maximum output series length is exceeded then an error is raised. If a byte sequence does not correspond to the two types of byte sequences described, then it remains unchanged. For example, if a particular character has a value of 70, then it will not be replaced. The relationship between byte sequences and sets of selected bytes is shown in table 1.

TABLE 1

| Byte Sequence | Selected Bytes |
|---|---|
| 0 | 1 1 |
| 1 | 1 2 |

According to a second embodiment of the invention, the first type byte sequence corresponds to two characters wherein the first character has a value of 0. The second type byte sequence also corresponds to two characters, however, the first character has a value of 1. Prescribed relationships are then used to replace the first and second type byte sequences with first and second type sets of selected bytes, respectively. For example, table 2 illustrates the relationships that dictate replacement of the first type byte sequences.

TABLE 2

| $1^{st}$ type byte sequence | $1^{st}$ type set of selected bytes |
|---|---|
| 0 0 | 1 2 |
| 0 1 | 1 3 |
| 0 W | 1 4 W |

According to table 2, if characters in the first type byte sequence have the values 0 0 and 0 1, they are replaced with the values 1 2 and 1 3, respectively. If the second character's value is greater than 1, then it is replaced with the two characters whose values are 4 W. The character whose value is equal to W corresponds to the second character in the first type byte sequence. According to the disclosed embodiment, the value of W can be in the range of 2~255. If the maximum output byte series length is exceeded, an error is raised.

Table 3 illustrates the relationships that dictate replacement of the second type byte sequence.

TABLE 3

| $2^{nd}$ type byte sequence | $2^{nd}$ type set of selected bytes |
|---|---|
| 1 0 | 1 6 |
| 1 1 | 1 7 |
| 1 X | 1 8 X |
| 1 Y | 1 Y |

According to table 3, if the characters in the second type byte sequence have the value 1 0 and 1 1, they are replaced with the values 1 6 and 1 7. If the second character has a value of X that ranges from 2~8, then it is replaced with the two characters whose values are 8 X. If the maximum output series length is exceeded, an error is raised. In addition, if the second character has a value of Y that ranges from 9~255, then it is not replaced. Furthermore, if the value of the first character in the first or second type byte sequence is neither 0 nor 1, then the byte sequence remains unchanged.

At this point, the server has either examined all of the bytes in the input byte series, or there is a terminal byte that has not been examined. At step S524, the server determines if the last byte in the input byte sequence is a terminal byte that has not been examined. If the last byte is a terminal byte, then the server replaces the last byte with a terminal byte pair at step S526. Otherwise, control passes to step S528. According to the disclosed embodiment, a terminal byte having a value of 1 is replaced with the two byte values 1 5. A terminal byte having a value of 0 is replaced with the two byte values 1 1. An error is raised if the maximum series length is exceeded. All other terminal byte values are not replaced.

At step S528, the server compares the size of the key value to a predetermined size. As previously stated, the predetermined size corresponds to the maximum byte size selected by the server to store an individual key value. If the size of the key value does not equal the predetermined size, then a suffix is appended thereto at step S530. The suffix is preferably chosen to be the character value 0. The suffix is specifically selected such that it sorts less than every possible substring in the reversed key value. Hence, a key value whose character values correspond to [65 70 72 80] would be turned into [65 70 72 80 0].

At step S532, the resulting character values are complemented (i.e., subtracted from 255). For example, complementing the character values [65 70 72 80 0] results in the character values [190 180 183 175 255]. The character sequence that results after performing step S532 constitutes the reversed key value (e.g., output byte series or transformed series of data bytes) for the key value examined at step S510. Steps S512–S532 function to map the key values into reversed key values that do not contain the character 0, while also sorting in the same manner as the original key values.

The second embodiment is preferred under circumstances where the amount of available memory limited or otherwise restricted. Specifically, the reversed key values constructed according to the second embodiment will normally result in shorter strings. Hence, the amount of memory required to hold the index is reduced.

Reconstructing Key Values

The UNDESCEND function performs specific operations on the output byte series (corresponding to each reversed key value) in order to generate a restored byte series that represents the original key value (i.e., input byte series) from which the reversed key value was generated. The specific details corresponding to the operation of the UNDESCEND function will be further described hereinbelow.

Upon receiving the transformed series of data bytes, the UNDESCEND function complements each byte from the output byte series. Next, a suffix is removed from the output byte series. However, the suffix is removed only if it matches the substring used as a suffix byte by the DESCEND function.

Figure 6:
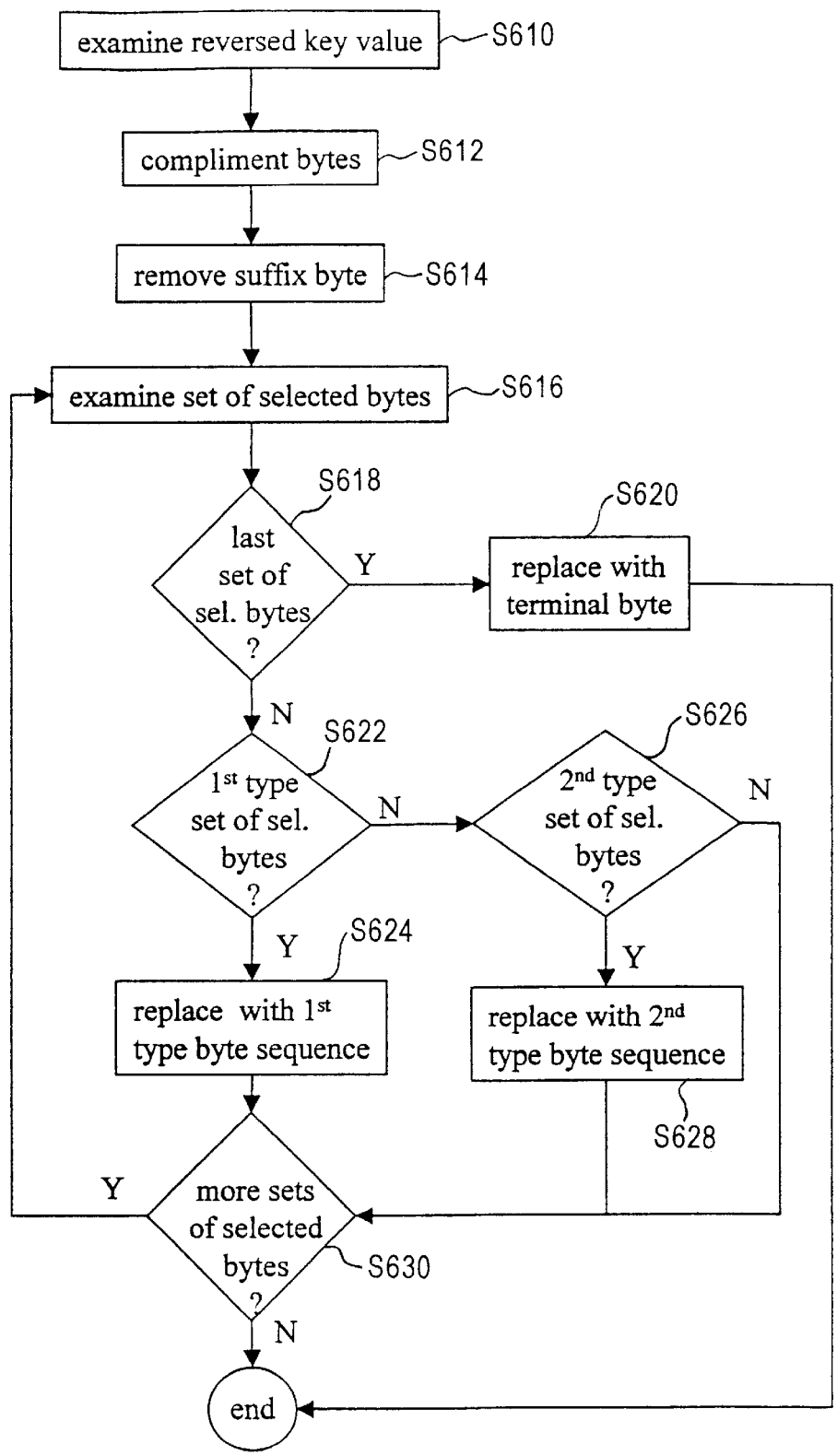
FIG. 6 is a flow chart detailing the steps necessary to restore the original index entries.

FIG. 6 is a flow chart illustrating the steps necessary to reconstruct the original key value from a reversed key value. This process corresponds to application of the UNDESCEND function to a reversed key value. At step S610, the reversed key value that must be reconstructed is examined. The server parses the reversed key value in the same manner as described above with respect to step S512. This parsing produces one or more bytes that make up the reversed key value. At step S612, the server complements each byte in the reversed key value (i.e., subtracts each character value from 255).

At step S614, the server removes a suffix from the reversed key value. The suffix removed corresponds to the suffix which was appended while the sortability of the key entries was being reversed. For example, at step S530 (FIG. 5), a character value of 0 was appended to the entry. Accordingly, the value removed at step S614 would correspond to the character value 0.

At step S616, the server examines a set of selected bytes. As step S618, the server determines if the set of selected bytes is the last set of selected bytes. If it is the last set of selected bytes, then at step S620, it is replaced with a terminal byte. Control then transfers to the end. According to the disclosed embodiment, the server examines the last set of selected bytes. If it contains the values 1 1, then the server replaces both values with the single value 0. If the last set of selected bytes contains the values 1 5, then the server replaces both values with the single value 1. If the set of selected bytes examined is not the last set, then control passes to step S622.

At step S622, the server determines if the set of selected bytes is of a first type. If so, then the first type set of selected bytes is replaced with a first type byte sequence at step S624. Otherwise, control passes to step S626. At step S626, the server determines if the set of selected bytes is of a second type. If so, then at step S628, the server replaces the second type set of selected bytes with a second type byte sequence. Otherwise control passes to step S630. Control also proceeds to step S630 after the set of selected bytes has been replaced at step S628. At step S630, the server determines if there are any additional sets of selected bytes. If there are additional sets of selected bytes, the control returns to step S616. Otherwise, the process terminates. The resulting character sequence corresponds to original key value.

According to the disclosed embodiment of the invention, the first and second type byte sequences described with reference to FIG. 6 correspond to the first and second type byte sequences used in the replacement steps of the reversal process (S516 and S520, FIG. 5). Furthermore, the first and second sets of selected bytes described with reference to FIG. 6 correspond to the first and second type data sequences identified in steps S514 and S518 (FIG. 5) of the reversal process. These values are further illustrated in tables 2 and 3.

Descend and Undescend

Figure 7A:
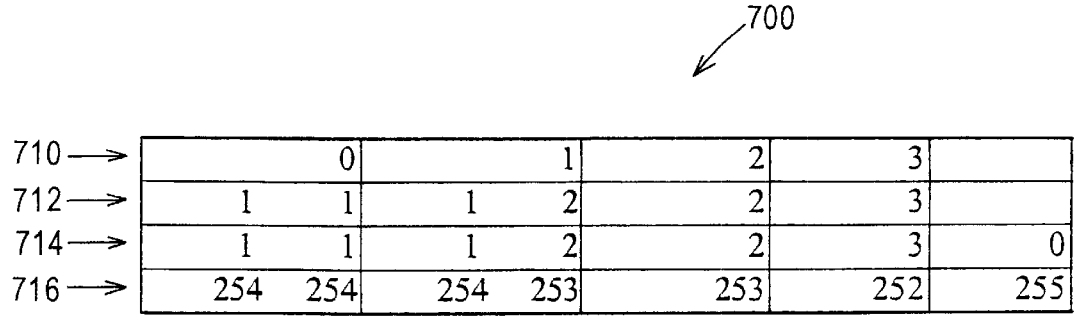
FIG. 7A is a table illustrating different stages of an exemplary index entry during application of the DESCEND function, according to a first embodiment of the present invention.

FIG. 7A is a table 700 illustrating the different character values of an exemplary index key value at various stages during application of the DESCEND function according to the first embodiment of the invention. The illustrated key value is selected to simplify understanding of the invention, rather than exemplifying an entry from the table 200 illustrated in FIG. 2. For purposes of explanation, it shall be further assumed that the maximum size allocated for storing key values is thirty (30) bytes. Therefore, any key values that do not equal or exceed thirty (30) characters will be less than the maximum size. The exemplary key value is a four-character string, where the characters within the character string are the values [0 1 2 3]. Accordingly, row 710 of the table 700 represents the manner in which the server would separately identify and represent each character value.

Row 712 of the table 700 illustrates the result of replacing the first and second type byte sequences. The server identifies first and second type byte sequences (i.e., [0] and [1]) and replaces them with first and second type sets of selected bytes according to the substitutions described in the first embodiment of the invention. Accordingly, row 712 indicates that [0] has been replaced with [1 1], while [1] has been replaced with [1 2]. The remaining character values stored in row 710 do not satisfy the selection criteria and therefore remain unchanged in row 712. Row 714 illustrates the results after the server has examined the size of the key value and compared it to the maximum size allocated for storing key values. The server has determined that the size of the key value is less than this maximum size, and therefore appended the value 0 thereto.

The values from row 714 are then complemented in order to arrive at a reversed key value having reversed sortability properties. The reversed key values are stored in row 716.

The reversed key value stored in row 716 of the table would then be arranged, within the index, in the normal manner that key values are sorted, i.e., ascending order.

Since the DESCEND function has been applied to the key values, the sorted order will of the reverse key values, and consequently of the index entries, will actually be in descending order relative to the original key values. As suggested by the contents of rows 714 and 716, the larger character values (e.g., 3 and 2) are complemented to values that are smaller than the complemented values of the smaller character values (e.g., 0 and 1). Accordingly, [3] would be sorted prior to [2] within an index that is created based on reversed key values.

Figure 7B:
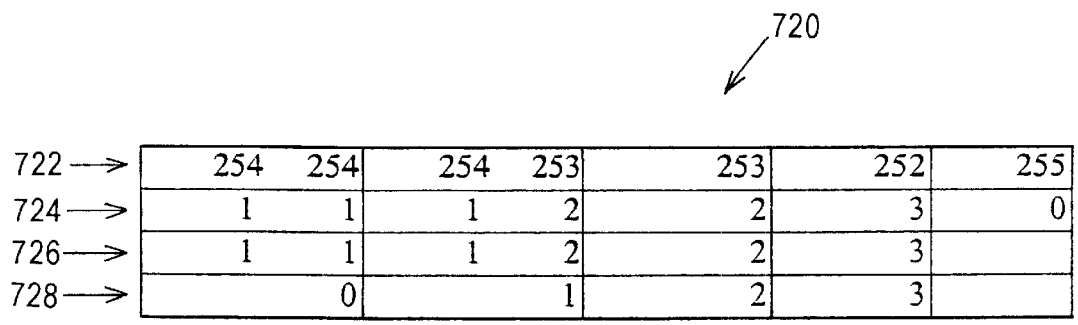
FIG. 7B is a table illustrating different stages of an exemplary index entry during application of the UNDE-SCEND function, according to the first embodiment of the present invention.

FIG. 7B is a table 720 illustrating the different character values of the reversed index key value at various stages during application of the UNDESCEND function. Row 722 illustrates the reversed key value that must be reconstructed. Row 724 shows the result of complementing each character value in the reversed key value. Row 726 illustrates the result of removing the previously appended character value of 0. Row 728 illustrates the recovered key value after the reverse substitutions. The server examines each set of selected bytes in order to determine whether they are of a first or second type. Based upon this determination, the server will replace the set of selected bytes with either a first or second type byte sequence. As illustrated in FIG. 7B, the server replaces the first two character values [1 1] with the single character value [0]. The next two character values [1 2] are replaced with the single character value [1]. The remaining two character values (2 and 3) do not satisfy the selection criteria, and therefore remain unchanged. As illustrated in FIG. 7B, the recovered key value stored in row 728 is identical to the original key value stored in row 710.

FIG. 7C is a table 750 illustrating the different character values of an exemplary index key value at various stages during application of the DESCEND function, according to the second embodiment of the invention. The maximum size allocated for storing key values is thirty (30) bytes. Therefore, any key values that do not equal or exceed thirty (30) characters will be considered less than the maximum size. The exemplary key value is a nine-character string, wherein the characters that form the character string have the values [0 1 0 2 0 5 1 9 0]. Accordingly, row 752 of the table 750 represents the manner in which the server would separately identify and represent each character value.

Row 754 of the table 750 illustrates the result of replacing the first and second type byte sequences. The replacement process also corresponds to executions of steps S514–S522 of the flow chart shown in FIG. 5. Specifically, the server identifies first and second type byte sequences and replaces them with first and second type sets of selected bytes, according to the substitutions previously described with reference to table 2. Accordingly, row 754 indicates that [0 1] has been replaced with [1 3], [0 2] has been replaced with [1 4 2], etc. Additionally, the last byte in the key value illustrated in FIG. 7C is not part of a byte sequence that is replaced. Therefore, the single character value [0] is replaced with [1 1], as illustrated by row 754. Row 756 illustrates the results after the server has examined the size of the key value and compared it to the maximum size allocated for storing key values. The server has determined that the size of the key value is less than this maximum size, and therefore appended the value 0 thereto. Row 756 illustrates the results of steps S524–S530 of the flow chart (FIG. 5).

The values from row 756 are then complemented, as indicated by step S532 (FIG. 5), in order to arrive at a reversed key value having reversed sortability properties. The reversed key values are stored in row 758. As previously indicated, the reversed key value stored in row 758 of the table would then be arranged, within the index, in ascending order.

Application of the DESCEND function to the key values therefore results in index entries that will actually be sorted in descending order relative to the original key values. As suggested by the contents of rows 756 and 758, the larger character values are complemented to values that are smaller than the complemented values of the smaller character values.

FIG. 7D is a table 770 illustrating the different character values of the reversed index key value at various stages during application of the UNDESCEND function to the reversed key value stored in row 758. Row 772 illustrates the reversed key value that must be reconstructed. Row 774 shows the result of complementing each character value in the reversed key value (i.e., step S612). Row 776 illustrates the result of step S614, wherein the previously appended character value of 0 has been removed. Row 778 illustrates the recovered key value after the reverse substitutions previously described with reference to table 3 have been performed. Furthermore, the reverse substitutions correspond to execution of steps S616–S630. The server examines each set of selected bytes in order to determine whether it is of a first or second type. Based upon this determination, the server will replace the examined set of selected bytes with either a first or second type byte sequence. As illustrated in FIG. 7D, the server replaces the first two character values [1 3] with the two character values [0 1]. The next three character values [1 4 2] are replaced with the two character values [0 2]. The remaining character values are replaced, as previously stated, according to the substitutions illustrated in table 3. As illustrated in FIG. 7D, the recovered key value stored in row 778 is identical to the original key value stored in row 752.

EXAMPLE

Figure 8:
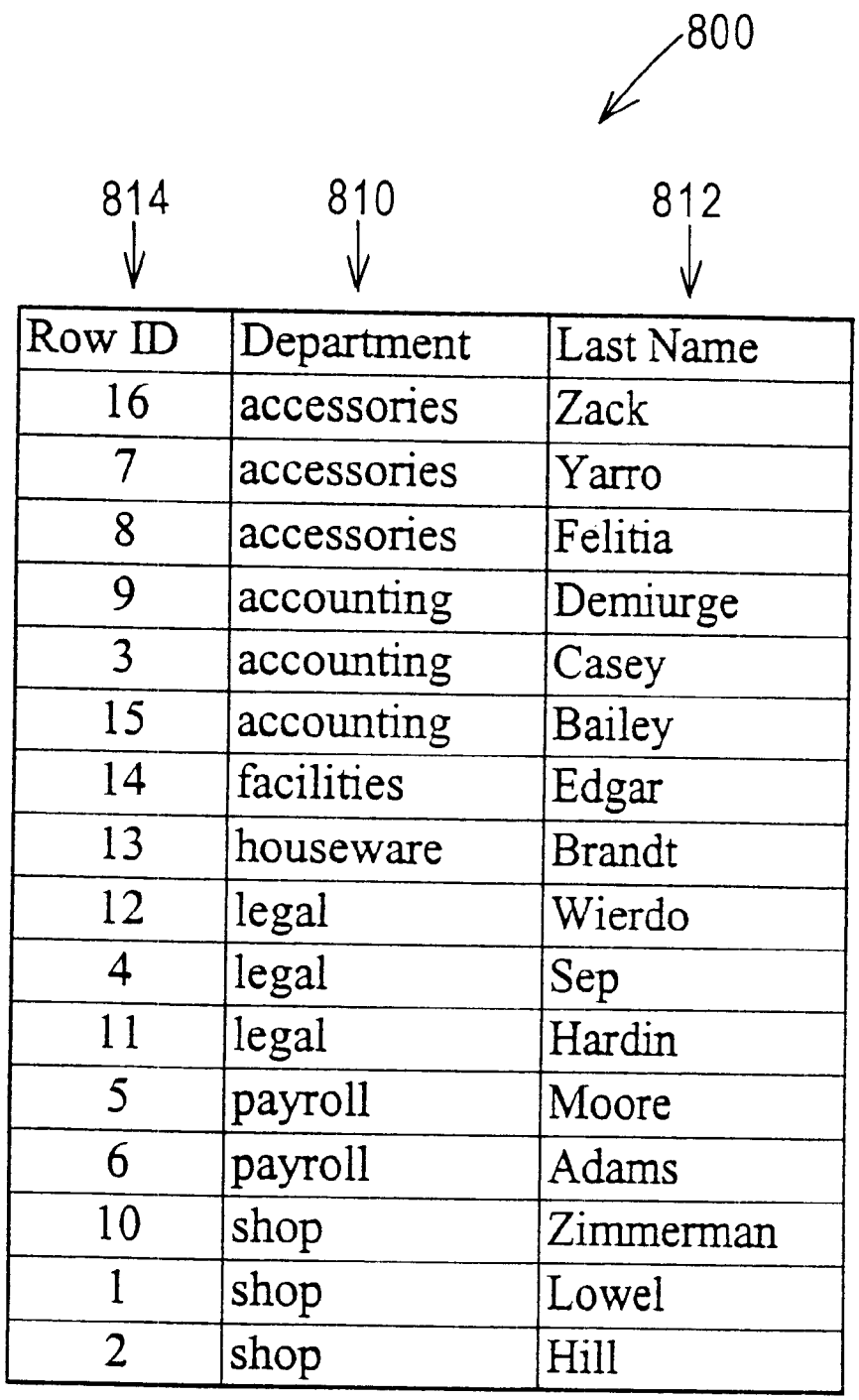
FIG. 8 is an index created in accordance with the present invention.

According to the present invention, indexes may be created in either ascending or descending order. Additionally, indexes may be created on multiple key columns such that the sub-keys are individually sorted in either ascending or descending order. FIG. 8 illustrates an index 800 that has been created on the Department and Last_Name columns 234, 230 of table 200. Accordingly, the index 800 includes three columns, namely: Department 810, Last_Name 812, and Row_ID 814. The Department column 810 stores a plurality of sub_key values that correspond to the different departments wherein each employee works. Additionally, the department names have been sorted in alphabetical order. The Last_Name column 812 stores sub_key values that correspond to the last names of the employees. Within each department, the Last_Name column 812 stores employee names in reverse alphabetical order (i.e., descending order).

As previously stated, the individual key entries are sorted within the index based on a sortability that may, in certain embodiments, be defined by an integer value assigned to each of the characters such as, for example, letter values. According to the first embodiment of the invention, the index entries "accessories" and "accounting" would be assigned the respective values:

[97 99 99 101 115 115 111 114 105 101 115]
[97 99 99 111 117 110 116 105 110 103]

As the key values are being sorted and inserted into the index, the character values are compared in order to determine where a particular key value will reside within the index. Referring to the two key values identified above, the first three character values are identical. The fourth character value for the key value "accessories" is smaller than the corresponding character value for the key value "accounting". Hence, if the key values are sorted in ascending order, "accessories" will precede "accounting".

In order to sort the same key values in descending order, the sortability of each key value may, for example, be reversed in accordance with the substitutions defined by the first embodiment of the invention substitutions defined by the first embodiment of the invention and table 1. The character values for the reversed key values corresponding to "accessories" and "accounting" would be, respectively:

[158 156 156 154 140 140 144 141 150 154 140 255]
[158 156 156 144 138 145 139 150 145 152 255]

Referring to the above-listed character values, the first three character values are identical. However, the fourth character value for the reversed key value "accessories" is larger than the corresponding value for the reversed key value "accounting". Therefore, the reversed key value "accounting" would be sorted prior to the reversed key value "accessories" within the index.

Functional Indexes

The DESCEND and UNDESCEND functions may be used in conjunction with functional indexes within standard SQL queries. A functional index is an index that is created based on one or more operations on at least one column of the table. DBMSs typically utilize an internal set of routines that determine the most efficient way to execute requests made through SQL statements. Prior to deciding whether to use any index, the server will typically perform query transformations to the SQL statement. However, such transformations are not readily applicable to all instances, particularly where the index must be sorted in descending order based on reversed key values.

According to the present invention, descending indexes are a special case of functional indexes, however, descending and functional indexes utilize different query transformations. As disclosed herein, specific query transformations are used in order to allow the server to make use of descending functional indexes. The query transformations are performed symbolically, and therefore no actual database or mathematical operations are performed. Upon completion of all transformations, the server performs the resulting database and mathematical operations specified by the transformed statement.

Figure 9:
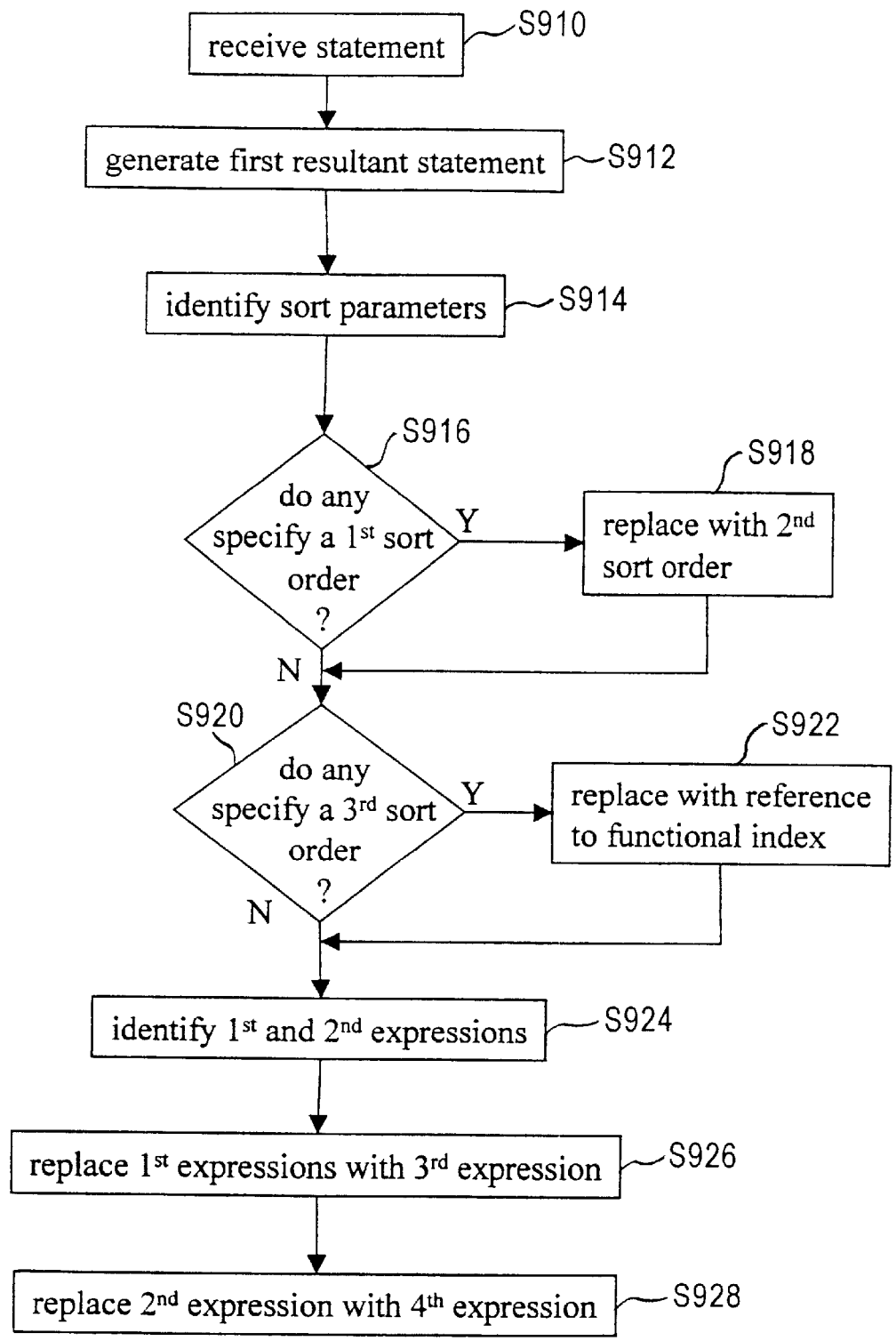
FIG. 9 is a flow chart illustrating transformations required to use a functional index.

FIG. 9 is a flow chart illustrating the symbolic transformations performed on a functional index. At step S910, the server receives a statement (i.e., SQL statement) that requires selecting data from a table. The statement can include zero or more sort parameters that specify a sorting order for the rows of data being selected. Alternatively, the statement may not include any sort parameters. If no sort parameter is provided, then the resulting rows may be returned in any order. At step S912, the server generates a first resultant statement based on the received statement. In generating the first resultant statement, the server identifies all occurrences of an expression defined by the functional index, and replaces such occurrences with a first function on the functional index. The first function is a restoration function, such as the UNDESCEND function, that requires reversing the sortability of the index key values.

At step S914, the server identifies any sort parameters that are present in the first resultant statement. According to the disclosed embodiment of the invention, the sort parameters correspond to the constraints on the "order by" clauses of the SQL statement, for example: order by Last_Name. Such a clause requires sorting the Last_Name column of the table in ascending order. At step S916, the server determines if any of the sort parameters specify a first sort order. If so, then at step S918, the first sort order is replaced with a second sort order. According to one embodiment of the invention, the first sort order is in the form:

order by UNDESCEND (IDX), where IDX is the representation of the functional index. Accordingly, the first sort order specifies that a restoration process be performed on the sortability of the entries in the functional index. The second sort order is in the form:

order by IDX desc

Therefore, the second sort order specifies sorting the functional index in descending order. A descending scan of a descending index yields results in ascending order At step S920, the server determines if any of the sort parameters specify a third sort order. If so, then the third sort order is replaced with a reference to the functional index at step S922. The third sort order is in the form:

UNDESCEND (IDX) desc, while the reference to the functional index is merely IDX. The third sort order first specifies that a restoration process be performed on the functional index. Next, the third sort order specifies that the entries resulting from the restoration process be sorted in descending order.

At step S924, the server identifies first and second type expressions within the transformed statement. The expressions identified by the server correspond to the operations that define the functional index. According to one embodiment of the invention, the first and second expression types are in the respective forms:

UNDESCEND (IDX) operator XXX
XXX operator UNDESCEND (IDX)

At step S926, the server replaces any first type expressions with a third type expression. The third type expression is in the form:

IDX operator_2 DESCEND (XXX)

In order to perform the replacement, the server replaces a first function on the functional index with a reference to the functional index. For example, UNDESCEND (IDX) is replaced with IDX. Next, the operand (i.e., XXX) is replaced with a third function on the operand. For example, XXX is replaced with DESCEND (XXX). Additionally, the operator is examined and replaced with a second operator (operator_2). The first and second operators are identified and replaced based the relationship shown in table 4 below:

TABLE 4

| Operator | Operator_2 |
|---|---|
| = | = |
| < | > |
| > | < |
| ≤ | ≥ |
| ≥ | ≤ |

At step S928, the server replaces any identified second type expressions with a fourth type expression. The fourth type expression is in the form:

DESCEND (XXX) operator_2 IDX

As suggested above, the second type expression is selected such that the operand precedes the operator. In order to perform the replacement required by step S928, the server replaces the operand with a third function on the operand. For example, XXX is replaced with DESCEND (XXX). Next, a first function on the functional index is replaced with a reference to the functional index. For example, UNDESCEND (IDX) is replaced with IDX. Finally, the operator is examined and replaced with a second operator (operator_2) in accordance with the relationship shown in table 4.

EXAMPLE

Figure 10:
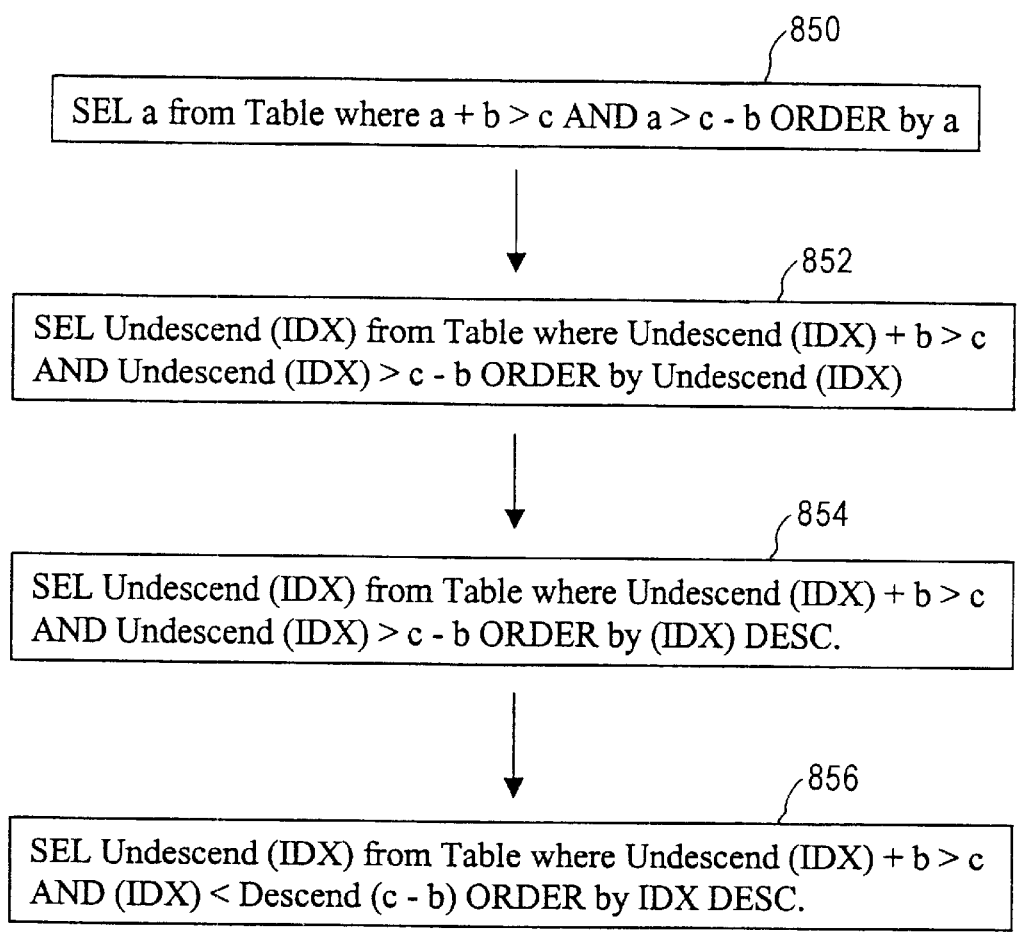
FIG. 10 is a block diagram illustrating the result of various stages during transformation of an SQL statement.

FIG. 10 illustrates the result of various stages during the transformation of an SQL statement. The received statement is identified by the reference numeral 850. A first symbolic transformation is performed on the received statement in order to generate a first resultant statement 852 based on step S912 (FIG. 9). The server identifies an expression defined by the functional index (e.g., a), and replaces it with a first function on the functional index (e.g., SEL UNDESCEND (IDX)). A second symbolic transformation is performed on the first resultant statement to generate a second resultant statement 854. The second symbolic transformation is performed in accordance with steps S914–S922 (FIG. 9). The server identifies the sort parameter specified by the SQL statement (e.g., ORDER by UNDESCEND (IDX)). Since the sort parameter specifies the first sort order defined above, the server replaces it with the second sort parameter (e.g., ORDER by (IDX) DESC). Next, a third symbolic transformation is performed on the second resultant statement in order to generate a transformed statement S856 capable of being evaluated by the server. The third symbolic transformation is performed in accordance with steps S924–S928 (FIG. 9). The server identifies the first type expression in the statement (e.g., UNDESCEND (IDX)>c–b), and replaces it with the third type expression (e.g., IDX<DESCEND (c–b)), as previously described. The resultant statement from the transformation may now be correctly evaluated by the server.

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of implementing a descending index comprising the steps:
 receiving a statement that requires creating an index, in descending order, on at least one column of a table;
 reversing a sortability of each key value retrieved from a key column of the table to form a plurality of reversed key values, each key value being an arbitrary variable length string; and
 arranging index entries, within the index, in a sorted order dictated by the reversed key values;
 wherein the sortability of a particular key value corresponds to the characteristics of that particular key value that determine its sorted order relative to other key values.

2. The method of claim 1 further comprising the step of applying a reconstruction function to each reversed key value to reconstruct the key value that was used to create the reversed key value.

3. The method of claim 1 wherein:
 each key value consists of a series of bytes; and
 the step of reversing includes the step of reversing the sortability of the series of bytes.

4. The method of claim 1 wherein:
 each key value consists of a series of values selected from a fully ordered set of values; and
 the step of reversing includes the step of reversing the sortability of the series of values selected from the fully ordered set of values.

5. The method of claim 1 wherein the step of reversing the sortability of each key value includes the steps:
 converting each key value into a series of bytes;
 replacing predetermined byte sequences from the series of bytes with sets of selected bytes;
 appending a suffix to each series of bytes; and
 complementing each byte from the series of bytes.

6. The method of claim 5, further comprising the steps:
 determining, prior to appending the suffix, a size of the key value;
 if the size of the key value is less then a predetermined size, then performing the step of appending a suffix; and
 if the size of the key value is greater than or equal to the predetermined size, then not performing the step of appending a suffix.

7. The method of claim 5, wherein each predetermined byte sequence contains two bytes, the method further comprising the steps:
 identifying first type byte sequences within the series of bytes; and
 identifying second type byte sequences within the series of bytes.

8. The method of claim 7 wherein the step of replacing predetermined byte sequences further comprises the steps:
 replacing first type byte sequences with first type sets of selected bytes; and
 replacing second type byte sequences with second type sets of selected bytes.

9. The method of claim 8, further comprising the steps:
 determining if the last byte was part of a byte sequence that was previously replaced; and
 if the last byte was part of a byte sequence that was previously replaced, then replacing the last byte with a terminal byte pair.

10. The method of claim 2 wherein the step of applying a reconstruction function includes the steps:
 converting each reversed key value into a series of bytes;
 complementing each byte from the series of bytes;
 removing a suffix from the series of bytes; and
 generating a restored series of bytes, corresponding to the key value that was used to create the reversed key value, by replacing sets of selected bytes with predetermined byte sequences.

11. The method of claim 10 wherein each set of selected bytes includes either of two bytes and three bytes, and the step of generating further includes the steps:
 restoring the sortability of the series of bytes by performing the steps:
  examining a set of selected bytes;
  if the set of selected bytes examined is the last in the series of bytes, then replacing the set of selected bytes with a single terminal byte; and
  if the set of selected bytes examined is not the last set of selected bytes in the series of bytes then performing the steps:
   if the set of selected bytes is of first type, then replacing the set of selected bytes with a first type byte sequence, if the set of selected bytes is of a second type, then replacing the set of selected bytes with a second type byte sequence, and repeating the step of restoring until the entire series of bytes has been examined.

12. A method of using a functional index comprising the steps:

receiving statement that requires selecting zero or more rows of data from a table;

performing a first symbolic transformation on the received statement to generate a first resultant statement having all instances of an operation defined by the functional index replaced with a first function on the functional index, performing a second symbolic transformation on the first resultant statement to generate a second resultant statement; and performing a third symbolic transformation on the second resultant statement to generate a transformed statement capable of being evaluated by a server.

13. The method of claim 12 wherein the step of receiving a statement includes the step of receiving a statement that includes a sort parameter which specifies a sort order for the at least one row of data selected.

14. The method of claim 12 further comprising the steps:

determining if the statement includes a sort parameter that specifies a sort order for the at least one row of data selected; and if the statement does not include a sort parameter, then selecting a sort parameter that specifies a prescribed sort order for the at least one row of data selected.

15. The method of claim 14 wherein the step of performing a second symbolic transformation includes the steps:

examining the content of the sort parameter;

if the sort parameter specifies a first predetermined sort order, then replacing the first predetermined sort order with a second predetermined sort order; and if the sort parameter specifies a third predetermined sort order, then replacing the third predetermined sort order with a reference to the functional index.

16. The method of claim 15 wherein the third predetermined sort order requires restoring a sortability of key values in the functional index and sorting the key values in descending order.

17. The method of claim 12 wherein the step of performing a third symbolic transformation includes the steps:

identifying a first expression and second expression;

replacing the identified first expression with a third expression; and replacing the identified second expression with a fourth expression.

18. The method of claim 17 wherein the step of replacing the identified first expression includes the steps of:

replacing a first function on the functional index, that is contained in the first expression, with a reference to the functional index;

replacing a first type operator, that is contained in the first expression, with a second type operator; and replacing an operand, that is contained in the first expression, with a third function on the operand.

19. The method of claim 18 wherein the step of replacing a first type operator includes the step of selecting the first type operator and the second type operator from the group of first and second type operators consisting of: (=, =), (<, >), (>, <), (<=, >=), and (>=, <=).

20. The method of claim 17 wherein the step of replacing the identified second expression includes the steps of:

replacing a first function on the functional index, that is contained in the second expression, with a reference to the functional index;

replacing a first type operator, that is contained in the second expression, with a second type operator; and replacing an operand, that is contained in the second expression and precedes the first function, with a third function on the operand.

21. The method of claim 20 wherein the step of replacing a first type operator includes the step of selecting the first type operator and the second type operator from the group of first and second type operators consisting of: (=, =), (<, >), (>, <), (<=, >=), and (>=, <=).

22. A computer-readable medium carrying one or more sequences of instructions for implementing a descending index, wherein execution of the one or more sequences of instructions by one or more processors causes the one or more processors to perform the steps of:

receiving a statement that requires creating an index, in descending order, on at least one column of a table;

reversing a sortability of each key value, retrieved from a key column of the table to form a plurality of reversed key values, each key value being an arbitrary variable length string; and arranging, within said index, index entries in a sorted order dictated by said reversed key values;

wherein the sortability of a particular key value corresponds to the characteristics of that particular key value which determine its sorted order relative to other key values.

23. The computer-readable medium of claim 22 wherein the one or more processors further perform the step of applying a reconstruction function to each reversed key value to reconstruct the key value that was used to create the reversed key value.

24. The computer-readable medium of claim 22 wherein:

each key value consists of a series of bytes; and the step of reversing includes the step of reversing the sortability of each series of data bytes.

25. The computer-readable medium of claim 22 wherein:

each key value consists of values selected from a fully ordered set of values; and the step of reversing includes the step of reversing the sortability of each value from the fully ordered set of values.

26. The computer-readable medium of claim 22 wherein the step of reversing the sortability of each key value includes the steps:

converting each key value into a series of bytes;

replacing predetermined byte sequences from the series of bytes with sets of selected bytes;

appending a suffix to each series of bytes; and complementing each byte from the series of bytes.

27. The computer-readable medium of claim 26, wherein the one or more processors further perform the steps:

determining, prior to appending the suffix, a size of the series of bytes;

if the size of the series of bytes is less than a predetermined size, then performing the step of appending a suffix; and if the size of the series of bytes is greater than or equal to a predetermined size, then not performing the step of appending a suffix.

28. The computer-readable medium of claim 26, wherein each byte sequence contains two bytes, and the one or more processors further perform the steps:
    identifying first type byte sequences within the series of bytes; and
    identifying second type byte sequences within the series of bytes.

29. The computer-readable medium of claim 28, wherein the step of replacing predetermined byte sequences further comprises the steps:
    replacing first type byte sequences with first type sets of selected bytes; and
    replacing second type byte sequences with second type sets of selected bytes.

30. The computer-readable medium of claim 29, wherein the one or more processors further perform the steps:
    determining if the last byte was part of a byte sequence that was previously replaced; and
    if the last byte was part of a byte sequence that was previously replaced, then replacing the last byte with a terminal byte pair.

31. The computer-readable medium of claim 23 wherein the step of applying a reconstruction function includes the steps:
    converting each reversed key value into a series of bytes;
    complementing each byte from the series of bytes;
    removing a suffix from the series of bytes; and
    generating a restored series of bytes, corresponding to the key value that was used to create the reversed key value, by replacing second sets of selected bytes with second predetermined byte sequences.

32. The computer-readable medium of claim 31 wherein each set of selected bytes includes either of two bytes and three bytes, and the step of generating further includes the steps:
    restoring the sortability of the series of bytes by performing the steps:
        examining a set of selected bytes;
        if the set of selected bytes examined is the last in the series of bytes, then replacing the set of selected bytes with a single terminal byte; and
        if the set of selected bytes examined is not the last set of selected bytes in the series of bytes then performing the steps:
            if the set of bytes is of first type, then replacing the set of bytes with a first type byte sequence,
            if the set of bytes is of a second type, then replacing the second type set of bytes with a second type byte segment, and
    repeating the step of restoring until the entire series of bytes has been examined.

33. A computer-readable medium carrying one or more sequences of instructions for using a functional index, wherein execution of the one or more sequences of instructions by one or more processors causes the one or more processors to perform the steps of:
    receiving a statement that requires selecting at least one row of data from a table;
    performing a first symbolic transformation on the received statement to generate a first resultant statement having all instances of an operation defined by the functional index replaced with a first function on the functional index;
    performing a second symbolic transformation on the first resultant statement to generate a second resultant statement; and
    performing a third symbolic transformation on the second resultant statement to generate a transformed statement capable of being evaluated by a server.

34. The computer-readable medium of claim 33 wherein the first function requires restoring a sortability of key values in the functional index.

35. The computer-readable medium of claim 33, wherein the one or more processors further perform the steps:
    determining if the statement includes a sort parameter that specifies a sort order for the at least one row of data selected; and
    if the statement does not include a sort parameter, then selecting a sort parameter that specifies a prescribed sort order for the at least one row of data selected.

36. The computer-readable medium of claim 35 wherein the step of performing a second symbolic transformation includes the steps:
    examining the content of the sort parameter;
    if the sort parameter specifies a first predetermined sort order, then replacing the first predetermined sort order with a second predetermined sort order; and
    if the sort parameter specifies a third predetermined sort order, then replacing the third predetermined sort order with a reference to the functional index.

37. The computer-readable medium of claim 36 wherein:
    the first predetermined sort order is a first function on the functional index; and
    the second predetermined sort order requires sorting key values in the functional index in reverse order.

38. The computer-readable medium of claim 36 wherein the third predetermined sort order is a second function on the functional index.

39. The computer-readable medium of claim 38 wherein the second function requires restoring a sortability of key values in the functional index and sorting the key values in descending order.

40. The computer-readable medium of claim 33 wherein the step of performing a third symbolic transformation includes the steps:
    identifying a first and second expression;
    replacing the identified first expression with a third expression; and
    replacing the identified second expression with a fourth expression.

41. The computer-readable medium of claim 37 wherein:
    the first expression includes:
        a first function on the functional index,
        a first type operator, and
        an operand,
        wherein the first function appearing on the left side of the first type operator; and
    the step of replacing the identified first expression includes the steps:
        replacing the first function on the functional index with a reference to the functional index,
        replacing the first type operator with a second type operator, and
        replacing the operand with a third function on the operand.

42. The computer-readable medium of claim 38 wherein the third function requires reversing a sortability of entries specified by the operand.

43. The computer-readable medium of claim 38 wherein the first type operator and the second type operator are selected from the group of first and second type operators consisting of; (=, =), (<, >), (>, <), (<=, >=), and (>=, <=).

44. The computer-readable medium of claim 37 wherein:

the second expression includes:
- an operand,
- a first type operator, and
- a first function on the functional index,
- wherein the first function appearing on the right side of the first type operator; and the step of replacing the identified second expression includes the steps of:
- replacing the first function on the functional index with a reference to the functional index,
- replacing the first type operator with a second type operator, and
- replacing the operand with a third function on the operand.

45. The computer-readable medium of claim 41 wherein the third function requires reversing a sortability of entries specified by the operand.

46. The computer-readable medium of claim 41 wherein the first type operator and the second type operator are selected from the group of first and second type operators consisting of: (=, =), (<, >),(>, <), (<=, >=), and (>=, <=).

* * * * *